Sept. 11, 1923.

C. A. HAGADONE

TRACTOR HITCH FOR CORN BINDERS

Filed June 23, 1919

1,467,375

Inventor:
Clinton A. Hagadone,
By Chas. E. Lord
Att'y.

Patented Sept. 11, 1923.

1,467,375

UNITED STATES PATENT OFFICE.

CLINTON A. HAGADONE, OF WESTERN SPRINGS, ILLINOIS, ASSIGNOR TO INTERNATIONAL HARVESTER COMPANY, A CORPORATION OF NEW JERSEY.

TRACTOR HITCH FOR CORN BINDERS.

Application filed June 23, 1919. Serial No. 305,990.

*To all whom it may concern:*

Be it known that I, CLINTON A. HAGADONE, a citizen of the United States, residing at Western Springs, in the county of Cook and State of Illinois, have invented certain new and useful Improvements in Tractor Hitches for Corn Binders, of which the following is a full, clear, and exact specification.

This invention relates to draft connections for tractors, and more particularly to draft connections between tractors and agricultural machines and to means carried by the draft connections for controlling the machine.

When agricultural machines are drawn or propelled by means of tractors, it is very desirable that the necessary adjustment for the proper operation of the machine may be made from the seat of the operator on the tractor. These adjustments differ with the various agricultural machines, but one of the most common and most important adjustments required for the successful operation of the machine is the tilting adjustment.

One object of the present invention, therefore, is to provide a construction of draft connection having means whereby the necessary adjustments on the trailing machine or on the machine propelled thereby may be made.

A further and more specific object is to provide an improved draft connection which permits the harvester or agricultural machine to be adjusted in such a manner that the plane of operation of the operative elements may be varied.

With these objects in view, the present invention comprises briefly a plurality of relatively movable connecting members between a tractor and an agricultural machine, these members carrying means for adjusting the elevation of the operative elements on the machine. More specifically stated, the construction by means of which the invention is carried out, comprises a draft member pivoted to the tractor and pivoted at its opposite end to a portion of the frame of the agricultural machine, the draft member being provided with means for relatively adjusting the said member with respect to the frame of the machine whereby the machine may be tilted in a manner to change the elevation of the operative elements of the machine.

Figure 1:
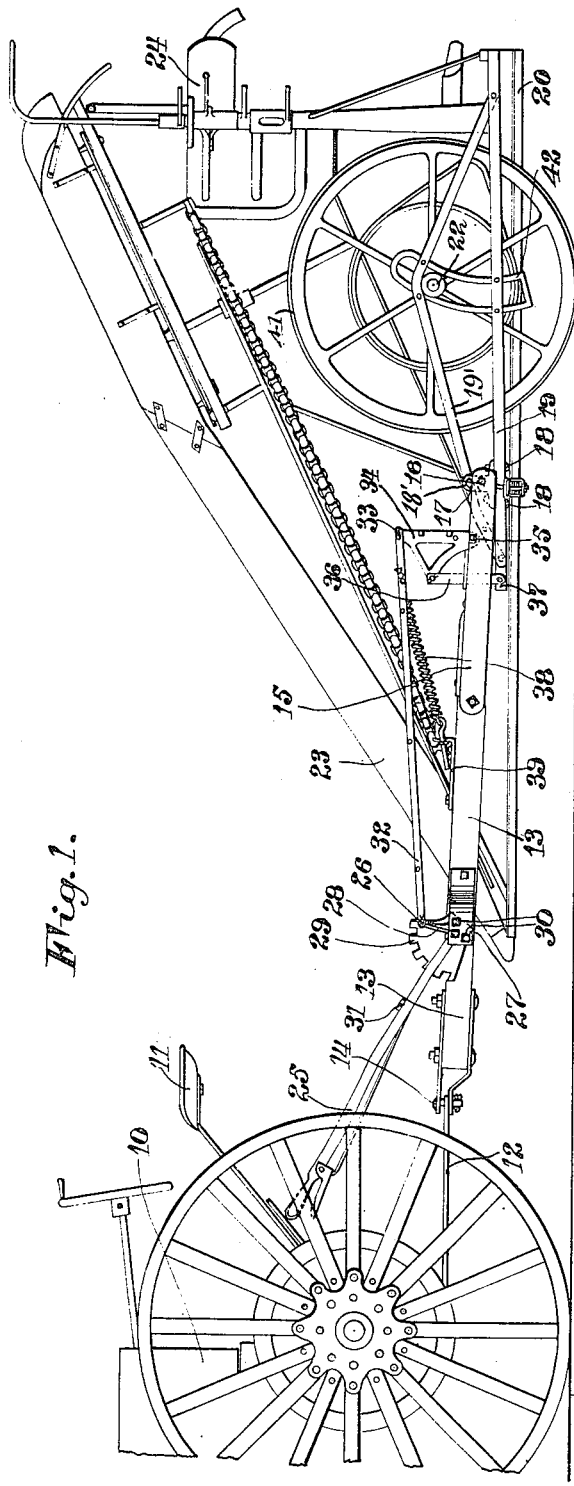
Figure 2:
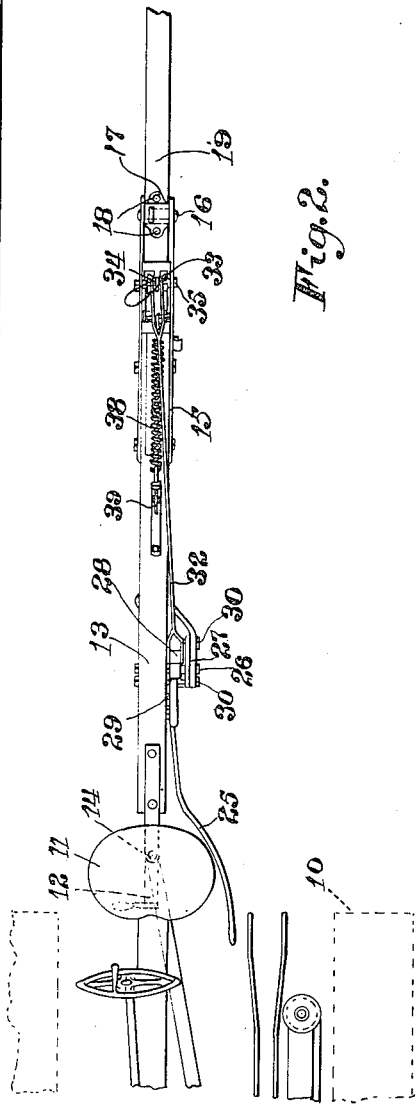

In the accompanying drawings, one embodiment of the invention has been illustrated, and Fig. 1 is a view in side elevation showing my improved draft connection; and Fig. 2 is a top plan view of the draft connection shown in Fig. 1.

In order to illustrate a complete practical embodiment of the invention, a harvesting machine,—in this instance a corn harvester, has been shown, the draft connection being secured at its front end to a tractor and at its rear end to the frame of the corn harvester. It should be understood, however, that the invention is equally well adapted for use in connection with other machines, and that it is not limited in any way to the corn harvester shown.

Referring to the drawings, in Fig. 1 I have illustrated the rear end of a tractor 10, having a seat 11 for the operator and a draw bar 12 suitably secured to the tractor frame and extending rearwardly therefrom. A draft member 13 is connected to the rear end of the draw bar 12 by means of a vertical pivot pin 14, the draft member being provided at its rear end with a pair of rearwardly extending bars 15. The bars 15 are pivotally mounted on the horizontal pivot pin 16 carried by a bracket 17 secured by bolts 18 and 18' to the draft members 19 and 19' carried by the frame of the corn harvester. The members 19 and 19' are rigidly secured to the cutter frame 20, the member 19' extending upwardly and over the axle 22 of the wheel 41 of the harvester. A yoke 42 rigidly secured to the members 19, 19' embraces the axle 22 and transmits the pull on the draft members to the wheel 41. The draft member and machine frame are journaled on the main axle 22 of the corn harvester in the well-known manner. The corn harvester is provided at its front end with the usual gathering members 23, and at its rear end with the usual binding mechanism 24. As stated above, in this specification, it is very desirable that means be provided which shall be accessible from the operator's seat on the tractor for changing the elevation of the operative elements of the machine connected to the tractor, and in this instance connections have been provided whereby the harvester may be tilted from the tractor. These connections include a lever 25, pivotally mounted on a pivot pin 26 carried by bracket 27 and by the draft member 13. As shown in Fig. 1, the front end of the lever 25 is easily accessible from the operator's seat. The lever 25 has rigidly secured thereto and extending away from the pivot pin 26 in a direction at an angle with the lever 25, an arm 28 which forms in connection with the lever 25 a bell crank lever. In order to lock the lever in a desired position of adjustment, the usual sector 29 is secured to bracket 27 and the draft member 13 by means of bolts 30, and the lever is provided with suitable latching means 31 cooperating with the sector 29. The outer end of the arm 28 has pivotally secured thereto the forward end of a link 32, and the rear end of this link is pivoted at 33 to the bell crank lever 34 pivoted at 35 to the arms 15 carried by the draft member 13. The bell crank lever 34 is connected by means of a link 36 to the forward end 37 of the draft member 19 above described. A spring 38 is interposed between the rear end of the link 32 and angular bracket 39 carried by the draft member 13, this spring assisting in counterbalancing the weight of the harvester disposed in the rear of the axle 22.

A brief description of the operation and construction above described will now be given.

When the operator desires to lower the front end of the corn harvester shown, the pawl locking means for the lever 25 is released and the lever is depressed, thereby exerting a forward pull on the link 32 and swinging the bell crank lever 34 in a counter clockwise direction about its pivot 35, thus pressing downwardly on the front portion 37 of the draft member 19 of the corn harvester, lowering the gathering members 23 and increasing the angle between the portion 37 of the member 19 and the draft member 13, the member 19 and harvester frame by which it is carried swinging about the main axle 22 of the corn harvester and the draft member 13 swinging on its pivot 16. When it is desired to raise the front end of the corn harvester, the lever will be operated in the opposite direction and the cooperating parts will also act in a direction opposite to that just described.

From the above description, it will be seen that an exceedingly simple and practical construction has been provided for tilting the harvester machine from the tractor, and moreover, a construction which can be quickly attached to and removed from the tractor and harvester. It will be evident that this construction is not limited in any sense to the particular machine illustrated, and that it is equally well adapted for use in connection with other machines.

While I have in the above specification described one practical embodiment of my invention and have illustrated this invention in connection with a particular type of machine, it should be distinctly understood that other machines may be utilized in connection therewith, and that various changes and modifications may be made without departing from the spirit and scope of the invention as expressed in the following claims.

I claim—

1. A draft connection for an agricultural machine comprising a plurality of longitudinally extending draft members, one having its front end adapted for connection to a tractor and the other having its rear end connected to an agricultural machine, said draft members being pivotally connected to each other and means carried by one of said draft members and extending forwardly so as to be within reach of the operator of the tractor for swinging one of said draft members about its pivot with respect to another of said draft members.

2. A draft connection, including in combination, a draft member having means at one end for connection to a tractor and pivotally connected at its opposite end to a second member carried by the frame of an agricultural machine, a lever carried by said draft member and disposed adjacent one end thereof, a second lever carried by said draft member and disposed adjacent the opposite end thereof, operative connections between said levers and means connecting one of said levers to said second member, whereby as said levers are adjusted on said draft member, the frame of said agricultural machine will be adjusted with respect to said draft member.

In testimony whereof I affix my signature.

CLINTON A. HAGADONE.